(12) United States Patent
Sheikhzadeh-Nadjar et al.

(10) Patent No.: US 7,139,707 B2
(45) Date of Patent: Nov. 21, 2006

(54) METHOD AND SYSTEM FOR REAL-TIME SPEECH RECOGNITION

(75) Inventors: Hamid Sheikhzadeh-Nadjar, Waterloo (CA); Etienne Cornu, Cambridge (CA); Robert L. Brennan, Kitchener (CA); Nicolas Destrez, Neuchantel (CH); Alain Dufaux, Montreux (CH)

(73) Assignee: AMI Semiconductors, Inc., Pocatello, ID (US)

( * ) Notice: Subject to any disclaimer, the term of this patent is extended or adjusted under 35 U.S.C. 154(b) by 815 days.

(21) Appl. No.: 10/277,454

(22) Filed: Oct. 22, 2002

(65) Prior Publication Data

US 2003/0110033 A1 Jun. 12, 2003

(30) Foreign Application Priority Data

Oct. 22, 2001 (CA) .................................. 2359544

(51) Int. Cl.
*G10L 15/08* (2006.01)
(52) U.S. Cl. ...................................................... 704/243
(58) Field of Classification Search ............... None
See application file for complete search history.

(56) References Cited

U.S. PATENT DOCUMENTS

| | | | |
|---|---|---|---|
| 5,704,004 A * | 12/1997 | Li et al. ..................... | 704/243 |
| 6,236,731 B1 | 5/2001 | Brennan et al. | |
| 6,249,761 B1 | 6/2001 | Phillips et al. | |
| 6,675,144 B1 * | 1/2004 | Tucker et al. ............... | 704/264 |
| 6,721,698 B1 * | 4/2004 | Hariharan et al. .......... | 704/203 |

FOREIGN PATENT DOCUMENTS

WO WO 00/60577 10/2000

OTHER PUBLICATIONS

Moreno, F. et al.; "A Flexible Architecture for Real-Time Speech Recognition"; Article; 1993; pp. 69-72; vol. 37. Nos. 1/5; Microprocessing and Microprogramming; Electronics Engineering Department, E.T.S.I. Telecommunicacion, U.P.M.; Ciudad Universitaria S/N. Madrid 28040, Spain; North Holland; Amsterdam, NL.
Deligne, Sabine et al.; Low-Resource Speech Recognition of 500-Word Vocabularies; Article; No Date; 4 pages; IBM Watson Research Center, Yorktown Heights, NY 10598; printz@us.ibm.com.

* cited by examiner

*Primary Examiner*—Susan McFadden
(74) *Attorney, Agent, or Firm*—Gardner Groff Santos & Greenwald, PC

(57) ABSTRACT

Method and system for real-time speech recognition is provided. The speech algorithm runs on a platform having an input-output processor and a plurality of processor units. The processor units operate substantially in parallel or sequentially to perform feature extraction and pattern matching. While the input-output processor creates a frame, the processor units execute the feature extraction and the pattern matching. Shared memory is provided for supporting the parallel operation.

23 Claims, 8 Drawing Sheets

Mel Frequency Bands

Buffer assignment to energy bins

METHOD AND SYSTEM FOR REAL-TIME SPEECH RECOGNITION

CROSS-REFERENCE TO RELATED APPLICATION

This application claims priority under 35 U.S.C. §119 to a Canadian Patent Application entitled, "Method and System for Real-Time Speech Recognition, having Ser. No. 2,359,544, filed Oct. 22, 2001, which is entirely incorporated herein by reference.

Favorable action in regard to the application is earnestly solicited.

FIELD OF THE INVENTION

The present invention relates to speech recognition, and more particularly a method and system for speech recognition substantially in real time.

BACKGROUND OF THE INVENTION

Today, speech recognition technology relies on a standard set of algorithms that are known to produce good results. When implemented on computer systems, these algorithms require a certain amount of storage and involve a relatively large number of complex calculations. Because of these requirements, real-time speech recognition systems based on these algorithms have so far not been successfully deployed in low-resource environments (i.e. low power consumption, low memory usage, low computation load and complexity, low processing delay).

An effort is ongoing to find ways to design speech recognition systems with reduced resource requirements. For example, Deligne et al. describe a continuous speech recognition system suitable for processors running at a minimum of 50 MIPS and having at least 1 Mbytes of memory ("Low-Resource Speech Recognition of 500-Word Vocabularies", Proceedings of Eurospeech 2001, pp. 1820–1832), and Y. Gong and U. H. Kao describe a system running on a 30 MHz DSP with 64K words of memory ("Implementing a high accuracy speaker-independent continuous speech recognizer on a fixed DSP", Proceedings of the ICASSP 2000, pp. 3686–3689). J. Foks presents a voice command system running on a 2.5 MHz CR16B processor ("Implementation of Speech Recognition on CR16B CompactRisc", Proceedings of the ICSPAT 2000).

Some algorithms have been developed that require fewer resources and are better adapted for low-resource environments. However, these algorithms are simpler in scope and usually designed for very specific situations. In addition, the algorithms have only allowed marginal improvements in power consumption over the algorithms described above and are still not suitable for ultra-low resource environments.

Another problem concerns speech recognition in noisy environments. In these situations, special algorithms have to be applied. The algorithms perform voice activity detection, noise reduction or speech enhancement in order to improve recognition accuracy. These algorithms also require complex calculations and therefore add a lot of overhead to the system, making it even more difficult to deploy robust speech recognition in low-resource environments.

Therefore, it is desirable to provide a speech recognition method and system to provide a high quality output, which can be deployed in low resource environments.

SUMMARY OF THE INVENTION

It is an object of the present invention to provide a novel method and system for speech recognition, which obviates or mitigates at least one of the disadvantages of existing methods and systems.

In accordance with an aspect of the present invention, there is provided a system for recognizing speech in real-time which includes an input processor for receiving samples of speech and creating a frame, and at least two processor units having functionality of feature extraction and pattern matching. The functionality is divided and assigned to each processor unit. The processor units operate sequentially or substantially in parallel.

In accordance with a further aspect of the present invention, there is provided a method of recognizing speech in real-time which includes the steps of:

receiving samples of speech and creating a frame; extracting a feature of the frame; and perform pattern matching based on the feature. The creating step, the extracting step and the performing step being implemented substantially in parallel.

In accordance with a further aspect of the present invention, there is provided a system for recognizing speech in real-time. The system includes: an input processor for receiving samples of speech and organizing the samples into a frame; and at least two programmable processor units having functionality of feature extraction of the frame based on Oversampled Filterbank Analysis (OFBA) and pattern matching. The functionality is divided and assigned to each processor unit, the feature extraction including a bin energy factorization and an additional signal processing for the feature extraction. The at least two processor units include: a first processor unit for performing the OFBA and the bin energy factorization; and one or more second processor units for performing the additional signal processing and the pattern matching. The processor units operate sequentially or substantially in parallel. The processor unit and the input processor operate sequentially or substantially in parallel.

In accordance with a further aspect of the present invention, there is provided a method of recognizing speech in real-time. The method includes the steps of: receiving samples of speech and creating a frame; extracting a feature of the frame by performing Oversampled Filterbank Analysis (OFBA); and performing pattern matching based on the feature. The creating step, the extracting step and the performing step are implemented substantially in parallel. The extracting step includes steps of: performing the OFBA and a bin energy factorization, and performing an additional signal processing for the feature extraction. The step of performing the OFBA and a bin energy factorization and the step of performing an additional signal processing are implemented substantially in parallel.

Other aspects and features of the present invention will be readily apparent to those skilled in the art from a review of the following detailed description of preferred embodiments in conjunction with the accompanying drawings.

BRIEF DESCRIPTION OF-THE DRAWINGS

The invention will be further understood from the following description with reference to the drawings in which.

DETAILED DESCRIPTION OF THE PREFERRED EMBODIMENT(S)

Figure 1:
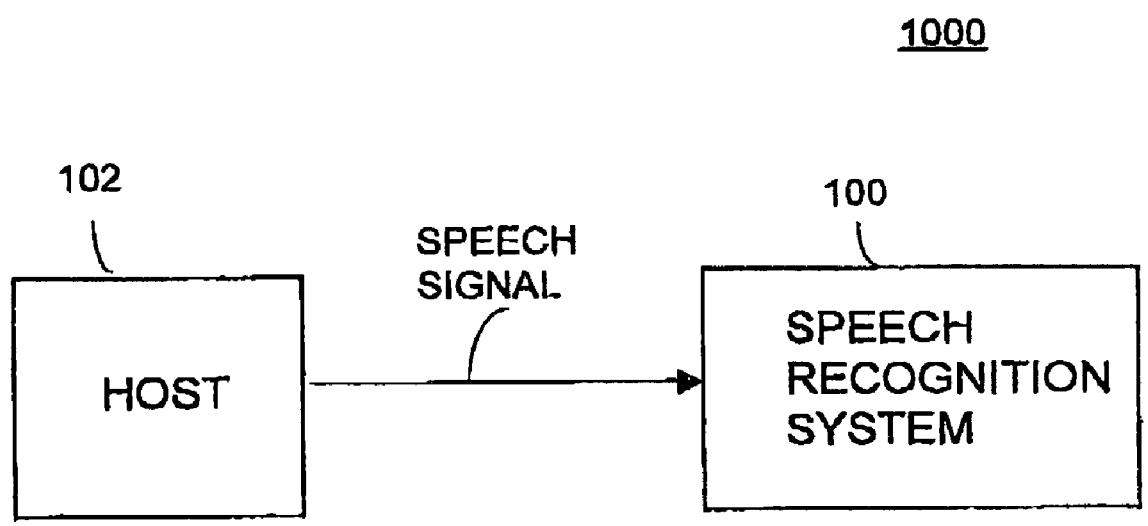
FIG. 1 is a block diagram a speech processing system in accordance with an embodiment of the present invention.

FIG. 1 shows a speech processing system in accordance with an embodiment of the present invention. The speech processing system 1000 of FIG. 1 includes a speech recognition system 100 and a host 102. The speech recognition system 100 has the functionality of feature extraction for extracting features from speech uttered by a user and the functionality of pattern matching for matching the extracted features against a set of references (i.e., pre-stored templates) in order to determine what a user said.

For feature extraction, the Mel Frequency Cepstrum Coefficients (MFCC) algorithm may be used. For pattern matching, the Hidden Markov Models (HMM) algorithm, the Dynamic Time Warping algorithm (DTW), or artificial neural networks may be used.

Speech signals are sent from the host 102 to the speech recognition system 100 for the feature extraction. The speech recognition system 100 executes the feature extraction, and then executes the speech recognition using the extracted features.

Based on the extracted features, training is executed off-line. The models obtained in the training are used during real-time speech recognition in the speech recognition system 100.

The training may be executed on the speech recognition system 100 or the host 102 using the extracted features.

The speech processing system 1000 may operate as a voice command system for executing commands of a user. When the speech processing system 1000 operates in this mode, the speech recognition system 100 recognizes valid commands and one or more devices (not shown) execute functions corresponding to the recognition result.

The speech recognition system 100 is implemented on a platform, such as digital signal processor (DSP), which is suitable for use in a low resource environment (i.e. low power consumption, low memory usage, low computation load and complexity, low processing delay).

Figure 2:
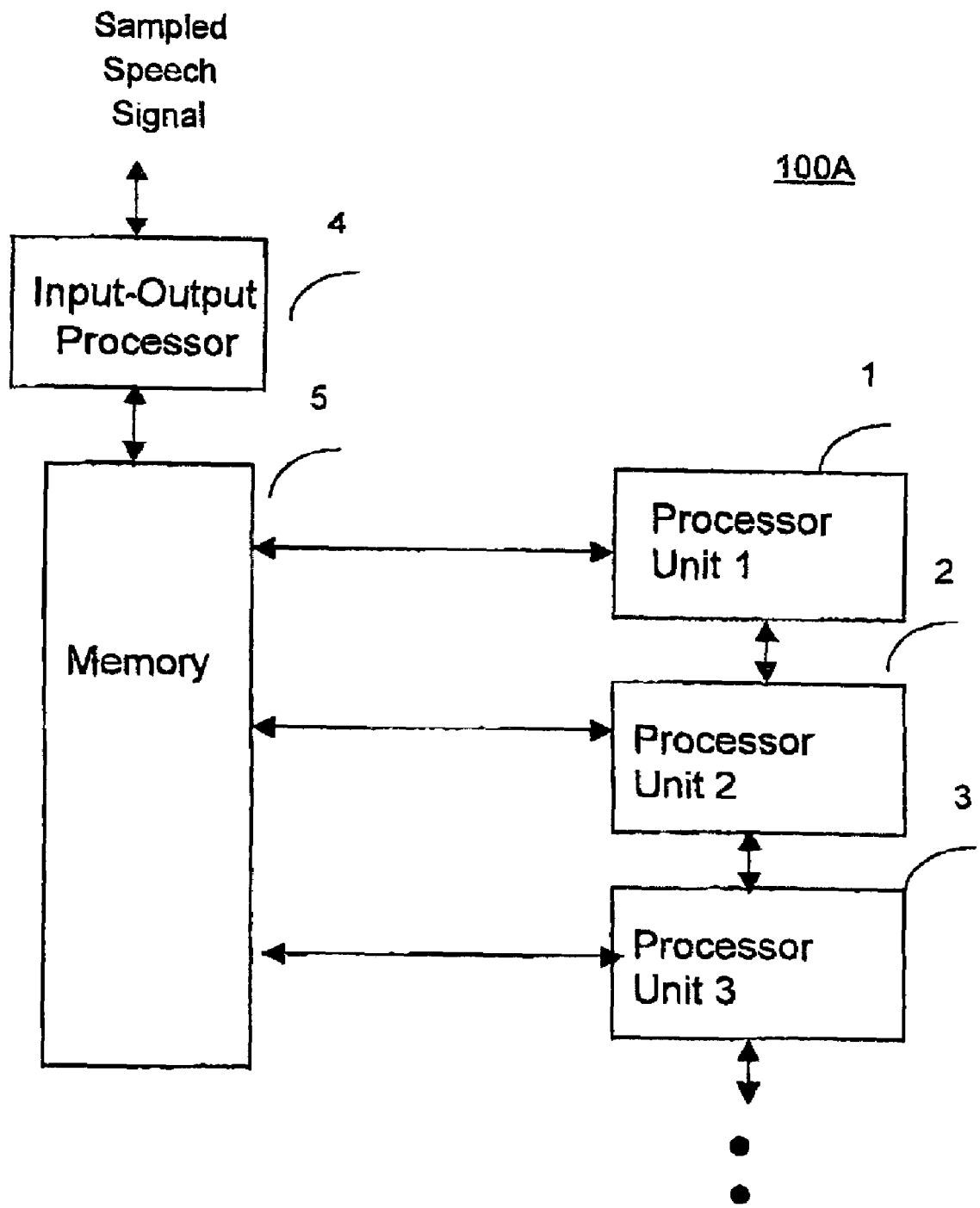
FIG. 2 is a block diagram showing one example of the platform of the speech recognition system of FIG. 1.

FIG. 2 is a block diagram showing one example of the platform of the speech recognition system of FIG. 1. The platform 100A of FIG. 2 includes a plurality of programmable processor units, an input-output processor (IOP) 4 and a memory 5. FIG. 2 shows three programmable processor units 1 to 3. However, the platform 100A may have more than three programmable processor units.

The processor units 1 to 3 directly or indirectly communicate with each other. The processor units 1 to 3 and the input-output unit 4 operate in parallel or sequentially. The processor unit 1, 2 or 3 may be microcoded to implement a weighted overlap-add (WOLA) filterbank as described below.

The processor units 1 to 3 perform feature extraction and pattern recognition. The steps of performing the feature extraction and pattern recognition are divided and assigned to the processor units 1 to 3 so that the processing undertaken by the processor units 1 to 3 can be done in parallel. The processor units 1, 2 or 3 may have the functionality of the training.

The input-output processor 4 manages incoming samples and outgoing data. A front-end processor (e.g. 102 of FIG. 1) includes an Analog/Digital (A/D) converter (not shown) that samples and digitizes incoming speech signals. The input-output processor 4 takes the incoming digitized speech signal from the front-end processor and applies a pre-emphasis window to the speech signal.

The shared memory 5 is provided for the processor units 1 to 3 and the input-output processor 4 to enhance inter-processor communication. On performing the feature extraction and pattern matching, the processor units 1 to 3 do not need to move their calculation results to each other, but rather need only store them in the shared memory 5. The input-output processor 4 outputs the frame data to the memory 5 and receives the outputs of the processor units 1 to 4.

In addition to the speech Input, the platform 100A may have an interface through which to communicate results with the outside world.

Figure 3:
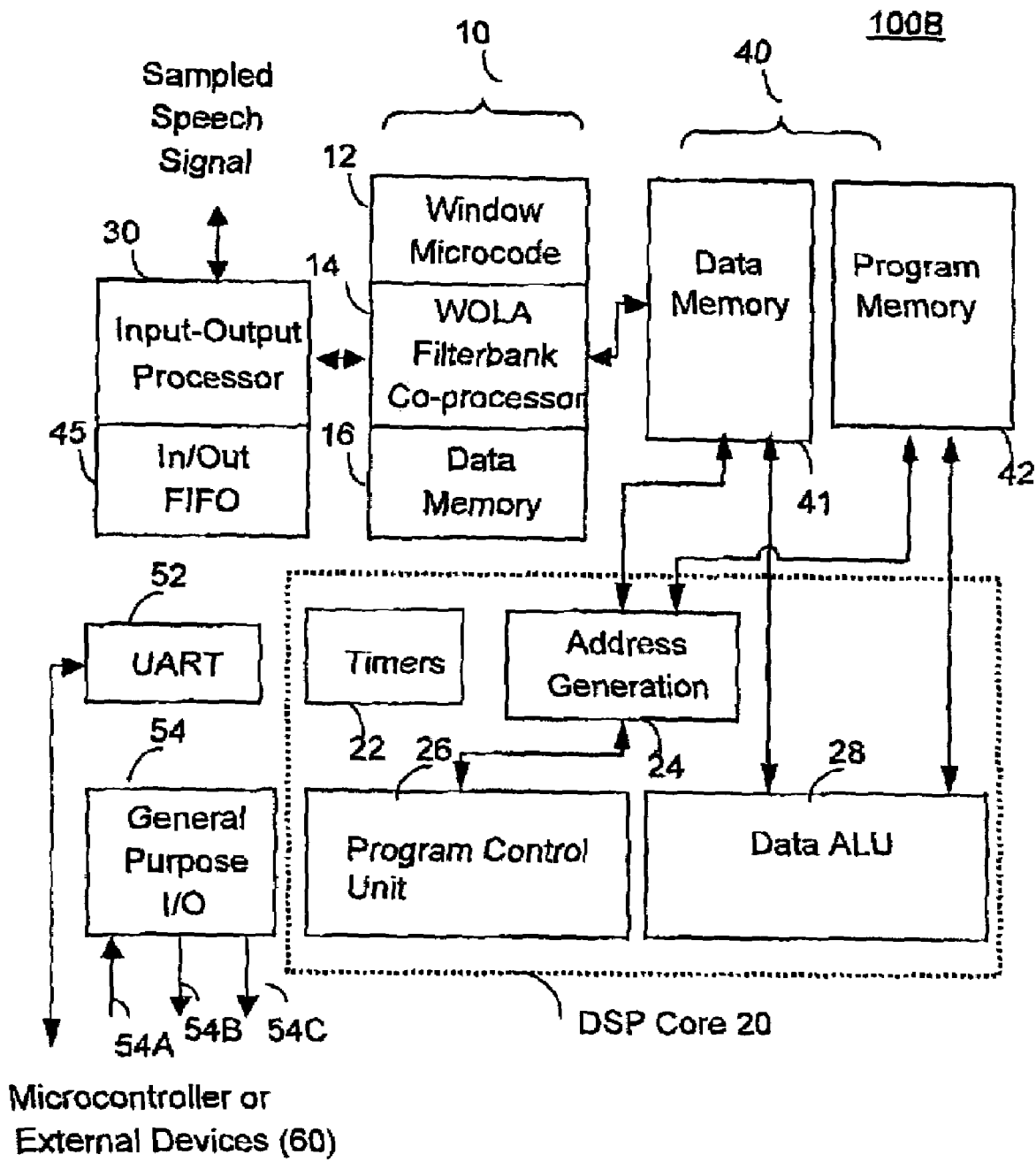
FIG. 3 is a block diagram showing another example of the platform of the speech recognition system of FIG. 1.

FIG. 3 is a block diagram showing another example of the platform of the speech recognition system 100 of FIG. 1. The speech recognition platform (referred to as DSP system hereinafter) 100B of FIG. 3 includes a microcodeable weighted overlap-add (WOLA) filterbank 10, a 16 bit fixed point DSP core 20, the input-output processor (IOP) 30 and Random Access Memory (RAM) 40. The WOLA filterbank 10, the DSP core 20 and the input-output processor 30 operate in parallel.

The input-output processor 30 is similar to the input-output processor 4 of FIG. 2. The input-output processor 30 obtains digitalized speech signals and creates a frame. The result is output to a first-in-first-out buffer (FIFO) 45.

The WOLA filterbank 10 includes a WOLA filterbank co-processor 14, and data memory 16. The WOLA filterbank 10 may operate as an oversampled WOLA filterbank as described in U.S. Pat. Nos. 6,236,731 and 6,240,192, which are incorporated herein by reference. In the speech recognition system 100, the WOLA filterbank 10 is microcoded (12) for performing windowing operations, the Oversampled Filterbank Analysis (OFBA) using the Weighted Overlap-Add (WOLA) method and the Fast Fourier Transform (FFT) and vector multiplications, which are included in the oversampled WOLA process.

The DSP core 20 includes timers 22, an address generation module 24, a program control unit 26, and a data Arithmetic and Logical Unit (ALU) 28. The DSP core 20 enables the system the implementation of time-domain algorithms that are not directly accomplishable by the WOLA co-processor 14 thereby adding a degree of re-configurability.

The RAM 40 includes a data memory 41 for storing data for the DSP core 20 and the WOLA filterbank 10, and a program memory space 42 for storing the program for the DSP cores 20.

The basic concept of the DSP system 100B is disclosed in U.S. Pat. Nos. 6,236,731, 6,240,192 and "A Flexible Filterbank Structure for Extensive Signal Manipulations in Digital Hearing Aids" by R. Brennan and T. Schneider, Proc. IEEE int. Symp. Circuits and Systems, pp. 569–572, 1998, which are incorporated herein by reference.

The DSP system 100B communicates with the outside world through the UART (serial port) 52, general-purpose input/output (I/O) pins 54 and an interface (not shown) dedicated to the speech signal coming from a mixed-signal (analog/digital) chip (not shown).

The input/output pins 54 can be used for performing actions as a result of recognizing commands, and for receiving addition input signals, regardless of a whether a microcontroller (60) is available or not. The microcontroller may further process the results of the voice command output from the DSP system 100B to control one or more systems (not shown).

For example, the input/output pins 54 include one or more input pins 54A, a visual output pin 54B and an action output pin 54C.

The input pins 54A are used to receive inputs. The input pins 54A may be connected to switches to allow commands, such as commands for starting/ending recognition, starting/ending feature extraction for training, starting/ending offline training, to be sent to the DSP system 100B. The visual output pin 54B is connected to devices, such as displays, LEDs, which provide visual output to a user. For example, the visual output pin 54B is used to inform the user of the current state of the system (e.g. feature extraction for off-line training mode, recognition mode).

The action output pin 54C can be connected to various output devices. For example, when the DSP system 100B recognizes a word, it activates one or a combination of these pins to drive one or more external devices, such as a speech synthesizer or a lamp.

The DSP system 100B can be applied to a wide variety of speech processing systems.

In the following description, the DSP system 100B is exemplified as the platform on which the speech recognition algorithm of the speech recognition system 100 of FIG. 1 runs.

Figure 4:
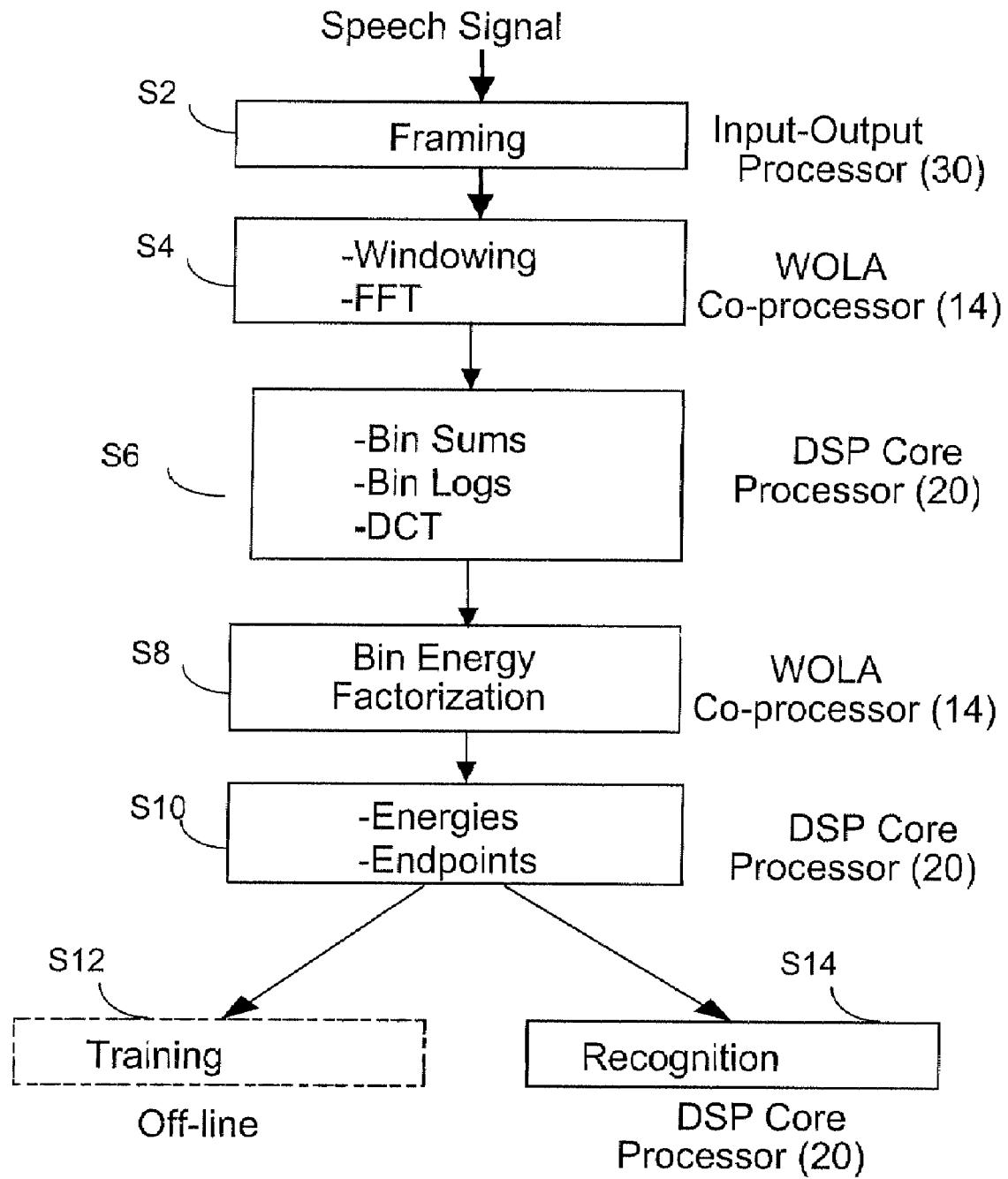
FIG. 4 is a flow diagram showing the operation of the DSP system of FIG. 3 for voice command algorithm operations.

FIG. 4 is a flow diagram showing the operation of the DSP system 100B of FIG. 3 for voice command algorithm operations. Referring to FIGS. 3 and 4, in step S2, framing operation is applied to speech signals by the input-output processor 30. The input output processor 30 creates frames of input speech signals for subsequent processing by the WOLA filterbank 10 and associated DSP core 20.

In step S4, a window, such as a Hanning window, is applied to the frame by the WOLA filterbank 10 (i.e. the WOLA co-processor 14), so that the distortions caused by transitions between frames are minimized, or at least made acceptable for use in subsequent processing. After the windowing operation, the WOLA filterbank 10 performs the OFBA including a final FFT.

In step S6, the sum of the energy bins is computed, and the logarithm (log) of the sum is taken by the DSP core 20. The Discrete Cosine Transform (DCT) is calculated using the log of the sum in the DSP core 20 to generate MFCC coefficients.

In step S8, bin energy factorization operation (vector multiplication) is executed by the WOLA co-processor 14.

In step S10, the total frame energy and energies of FFT bands are computed by the DSP core 20. The endpoint detection algorithm is also executed by the DSP core 20 to detect any non-speech frames by using one or more features, such as MFCC s, FFT band energies and the frame total energy. The words/speech frames are used for training/recognition (in step S12 and S14).

Steps S2 to S10 are parts to the feature extraction and endpoint detection processes. The data produced by these processes is stored in a circular buffer (not shown) where they are retrieved during both the training and the recognition phases.

In step S12, training is carried out offline. HMM or DTW may be used for the training. In step S14, speech recognition operation is done by the DSP core 20. The DSP core 20 may employ Viterbi algorithm or DTW for the speech recognition as explained below.

The steps S2, S4 (br S8) and S6 (or S10) are executed on the DSP 100B of FIG. 1 in parallel. The microcodeable WOLA filterbank 10 calculates FFT coefficients in parallel with the rest of the system and calculates the band energies during the process of MFCC calculation in parallel with the rest of the system. The DSP core 20 performs all other operations needed for speech recognition in parallel with the operation of other components.

The features most commonly used today in speech recognition systems are the MFCC and their first and second order differences. The number of coefficients and differences required and used varies depending on the implementation. The storage requirements for each word in the recognition vocabulary and the processing requirements are directly linked with the number of coefficients. The numbers of coefficients and derivatives vary and are optimized based on the desired vocabulary size, response time and expected quality of the recognition.

Figure 5:
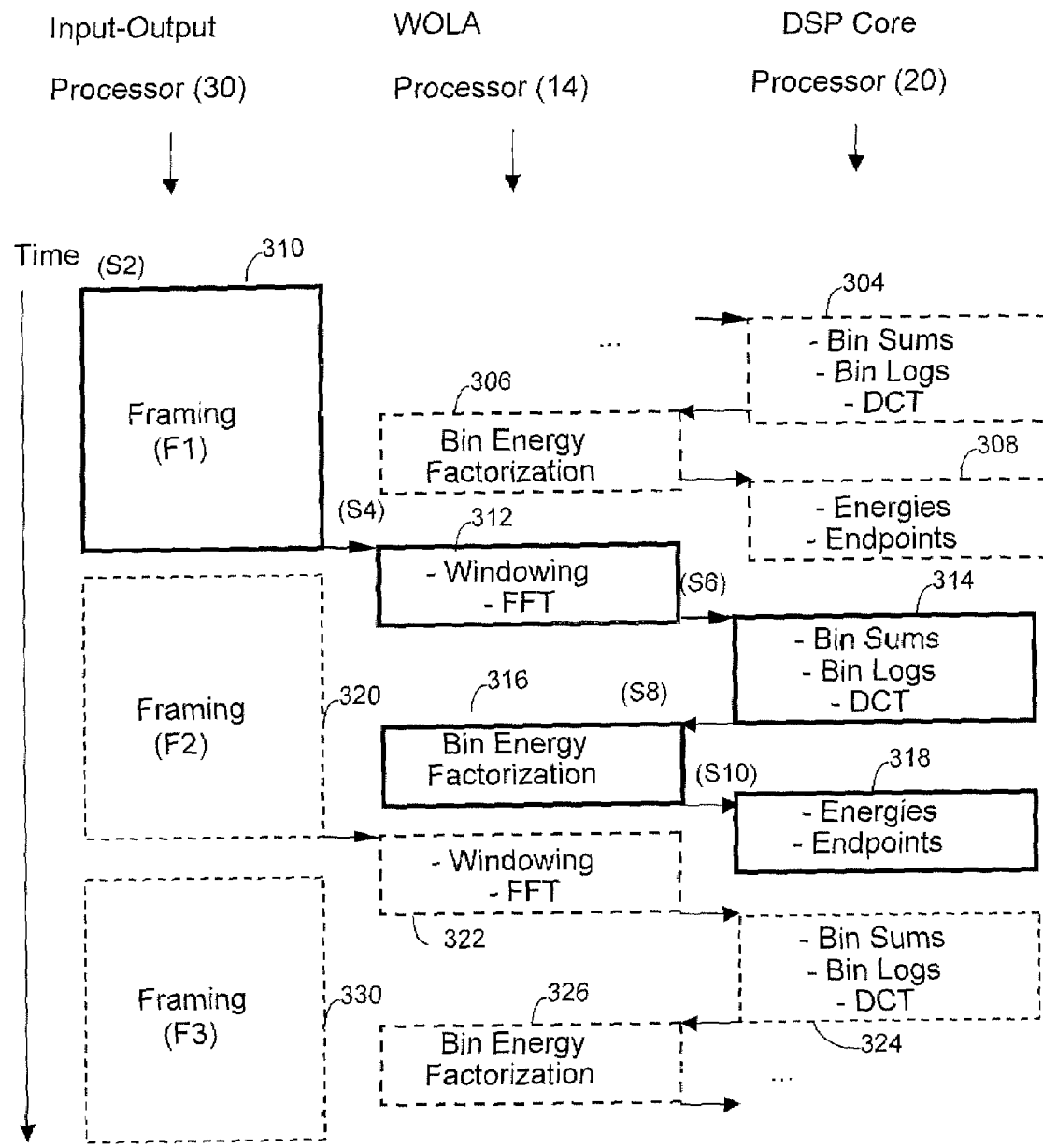
FIG. 5 is a schematic diagram showing how the feature extraction process is performed on the DSP system of FIG. 3.

FIG. 5 is a schematic diagram showing how the feature extraction is performed on the DSP system of FIG. 3. In FIG. 5, the endpoint detection is also shown. In FIG. 5, the three columns describe the tasks performed by the three processors (i.e. the WOLA filterbank 10, the DSP core 20 and the input-output processor 30 of FIG. 3) running in parallel.

Referring to FIGS. 3 to 5, the blocks 310, 312, 314, 316 and 318 indicate the operations performed sequentially on a single frame (e.g. a frame comprising 256 samples). The blocks 304 to 308 indicate the operations performed on a previous frame (not shown). The blocks 320 to 326 indicate the operations performed on a next frame (F2).

For example, the input-output processor 30 takes as input the speech signal sampled by the 14-bit Analog/Digital (A/D) converter (not shown) on the mixed-signal chip at a frequency of 8 kHz. The input-output processor 30 creates frames (F1, F2 and F3), each of which includes 256 samples, representing 32 milliseconds of speech (310, 320, 330, step S2). The framing operation is repeated on the input-output processor 30. The frames overlap for 128 samples (16 milliseconds). The pre-emphasis filter is applied to each signal.

The MFCC calculation is launched when the input-output processor 30 indicates that a new 256-sample frame (F1) is available for processing. This triggers a window process and an OFBA ending in a 256-point FFT, on the WOLA filterbank 10 (i.e. WOLA co-processor 14) (312, step S4). The oversampled filterbank is flexible and the FFT length can be chosen to be less than 256 points if desired to minimize the computations.

Figure 6:
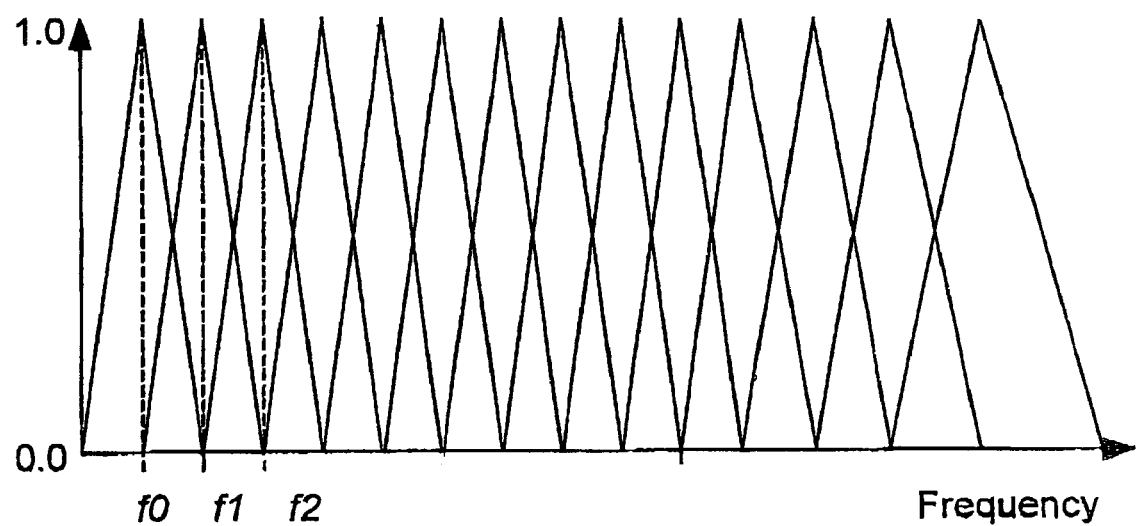
FIG. 6 is a schematic diagram showing how the triangular bands are spread along the frequency axis.

When the 256-point FFT is completed, the DSP core 20 assigns the resulting values to the L energy bins using a constant index table to map the resulting 129 FFT bands to the L energy bins. In case other FFT lengths are employed on the WOLA, the index table is changed accordingly. The next step in the MFCC calculation consists of determining the logarithm of the energy of L energy bins, which are depicted in FIG. 6 as triangular bands spread non-linearly along the frequency axis. The DSP core 20 calculates the logarithm of the energy of L energy bins. Then, the Discrete Cosine Transform (DCT) of the L log energy bins is calculated to generate MFCC coefficients. The DCT operation is implemented as the multiplication of the L log energy bins by a constant matrix, whose dimensions are L by the desired number of MFCC coefficients (314, step S6).

When the DCT operation is completed, the DSP core 20 launches the vector multiply function of the WOLA co-processor 14 to calculate the total frame energy and energies of FFT bands, which multiplies the 129 FFT band energies by a vector of constants stored in the RAM 40 (316, step S8).

When the vector multiplication is complete, the DSP core 20 (i.e. ALU 28) determines the absolute value of each one of the 129 FFT bands as well as the total frame energy (318, step S10).

FIGS. 4 and 5 show that the DCT is calculated by the DSP core 20. However, the WOLA filterbank 10 may be used to calculate the DCT.

The endpoint is extracted in step S10 of FIG. 4 and in blocks 308 and 318 of FIG. 5. However, the endpoint detection may alternatively be executed in step S6 of FIG. 4 and blocks 304, 314 and 324 of FIG. 5, for example, for energy-based end point detection.

FIG. 6 is schematic diagram showing how the triangular Mel Frequency bands are spread along the frequency axis. In FIG. 6, f0, f1, f2 represent the first three center frequencies of the energy bins. Assume that $Ef_i$ is the energy in FFT band i, and that when applying the filter for bin j, it is multiplied by the constant $K_{ij}$. When applying the filter for bin j+1 to the FFT band, the multiplying constant becomes $1-k_{ij}$. In consequence of this property, only half the multiplications are required when applying the filters to the FFT bands, the other values being calculated by a relatively simple subtraction as described below. Each FFT band energy is multiplied only by a single constant.

Figure 7:
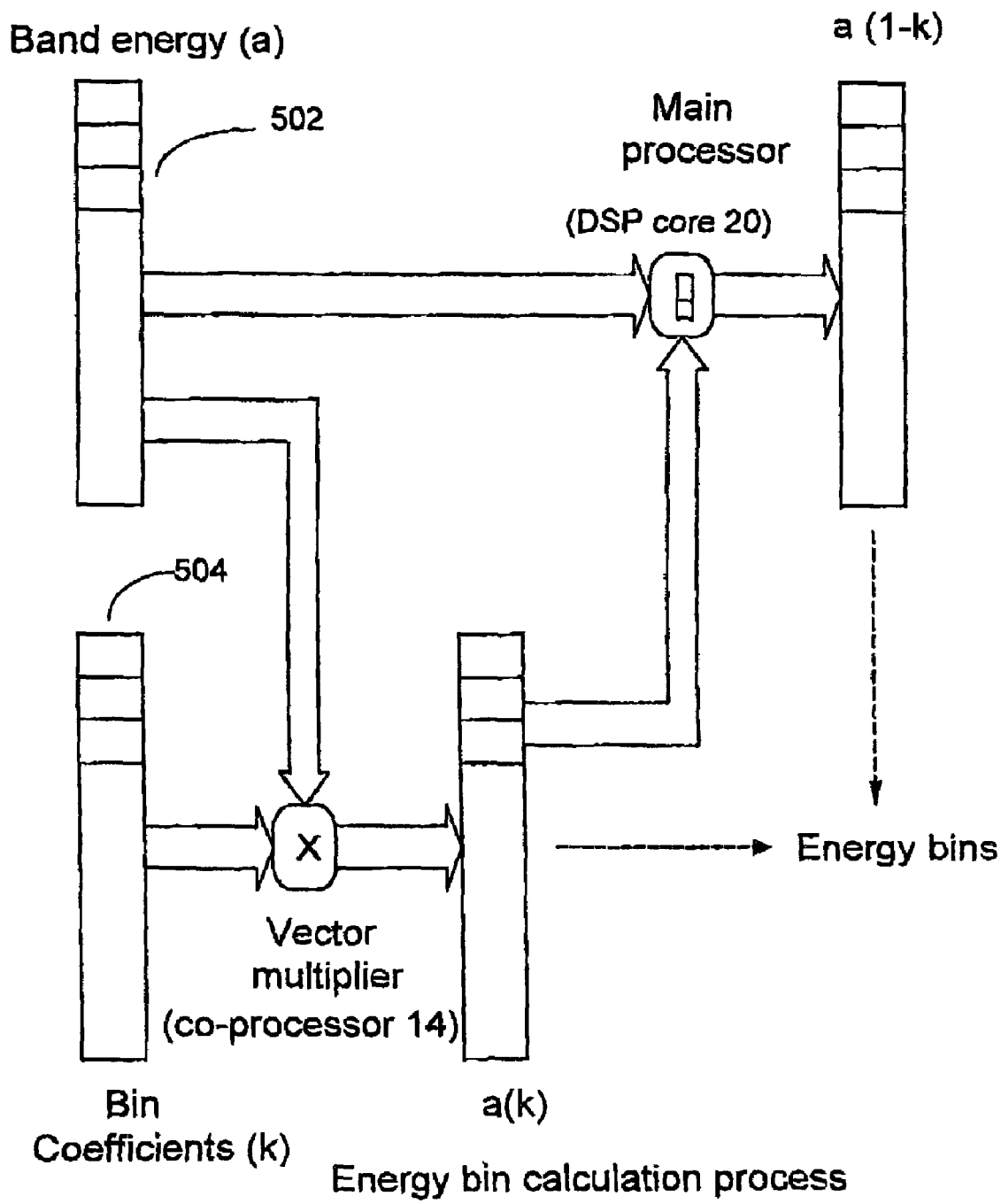
FIG. 7 is a data flow showing the energy bin calculation process.

FIG. 7 is a data flow diagram showing the energy bin calculation process. Referring to FIGS. 3 and 7, the FFT band energies (a) 502 are first multiplied by the vector of constants (multiplied by bin coefficient (k):504) using the WOLA co-processor 14. The resulting values, stored in the buffer a(k) are then subtracted from the original band energies in the DSP core 20 and stored in a separate buffer a(1−k). These calculations are repeated until all FFT band energies are processed.

Figure 8:
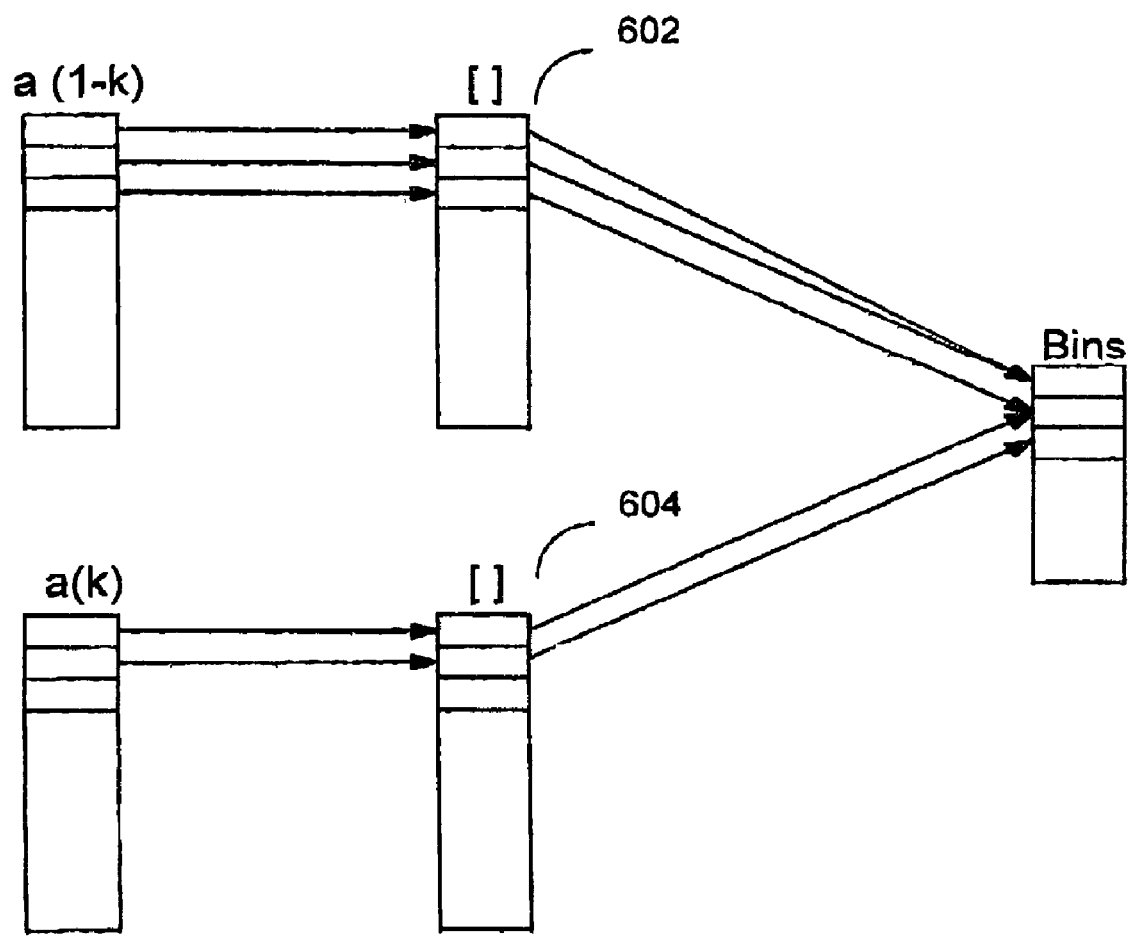
FIG. 8 is a schematic diagram showing how the DSP core of FIG. 3 assigns the values in the two buffers to the L energy bins.

FIG. 8 is a schematic diagram showing the operation of the DSP core 20 of FIG. 3 after completing the calculation of the energy bin. When the energy bin calculation is complete, the DSP core 20 assigns the values in the two buffers a(k) and a(1−k) to the L energy bins using two constant index tables 602 and 604 for mapping the FFT bands to the energy bin.

The index table contains the number of the bin to which the corresponding buffer entry contributes. After the buffers a(k) and a(1−k) have been assigned, the log of the L energy bins is taken using a base-2 log function One embodiment uses a 32-point look-up table and executes in 9 cycles, and has a 3% accuracy.

Once calculated, the MFCC coefficients are stored in a circular buffer where they can be retrieved for training or recognition Referring to FIG. 3, the endpoint detection is described in further detail. For real-time operation and to meet the limited memory resources available, the endpoint detection is implemented using the DSP core 20 and related components and features. As described above, the DSP core 20 detects any non-speech frames by using one or more of features, such as MFCC s, FFT band energies and the frame total energy. For example, the DSP core 20 compares the frame totals energy with a threshold. The threshold is regularly updated as function of a noise floor that is calculated during silence frames by the DSP core 20.

The pattern recognition is now described in further detail. The speech recognition system employs two techniques: HMM and DTW.

In the case of HMM, the Viterbi algorithm is employed to find the likelihood of Gaussian mixture HMMs. Generally, all model parameters, MFCC coefficients and temporary likelihood values maintained during the execution of the Viterbi algorithm are represented as 16-bit fixed-point values. When numbers are represented in fixed-point format, information may be lost during multiplications because the result is truncated to 16 bits. However, the DSP system 100B of FIG. 3 features a rounding instruction (i.e. rounding the results of calculation) that reduces these quantization errors.

The Dynamic Time Warping (DTW) algorithm of the pattern recognition is described. The DTW pattern-matching module of the DSP system 100B is used to calculate the distance between a word just spoken by a user and each individual reference word stored in memory. The DTW finds local distortions of a test utterance in the time-domain. According to the DTW, the test utterance can be aligned with a template by warping its time-domain axis.

A simple form of the DTW algorithm is used in the DSP system 100B of FIG. 3. Assume that the test utterance is composed of N feature vectors and that a reference word is composed of M feature vectors. As described in "Implementing a high accuracy speaker-independent continuous speech recognizer on a fixed DSP", by Y. Gong and U. H. Kao, Proceedings of the ICASSP 2000, pp. 3686–3689, the basic DTW algorithm consists of constructing an N by M matrix, D, where D[m,n] is calculated as follows.

if $m=1$ and $n=1$ $D[m,n]=d$ (1)

if $m>1$ and $n=1$ $D[m,n]=D[m-1,1]+d$ (2)

if $m=1$ and $n>1$ $D[m,n]=D[1,n-1]+d$ (3)

if $m>1$ and $n>1$ $D[m,n]$=minimum of (5) to (7) (4)

$D[m,n-1]+d$ (5)

$D[m-1,n]+d$ (6)

$D[m-1,n-1]+2*d$ (7)

In the equations (1) to (7), d represents the distance between a reference word frame m and a test frame n.

The Euclidian distance is used for these operations.

When D has been calculated, the distance between the test utterance N and a reference word M is defined as D[M,N] divided by N+M. In the speech recognition system implemented on the DSP system 100B, the N by M matrix is reduced to a 2 by M matrix in which the first column represents the previous values, i.e. the distances at test frame n−1, and the second column represents the test frame for which the distance are currently calculated.

When the second column is filled, its values are simply copied to the first column and the distances for test frame n+1 are calculated and inserted in the second column.

The initial values (in the first column) are calculated as per equations (1) and (2) above. For each frame in the test utterance, the first element of the second column is calculated as per equation (3) and the other values of the second column as per equation (4). When the end of the test utterance is reached, the top-right element of the matrix is divided by N+M to obtain the distance.

When the host 102 of FIG. 1 executes the training using the DTW, the host 102 includes the DTW pattern-matching module described above.

Noise reduction is now described in further detail. The DSP system 100B also may execute the noise reduction algorithm for reducing noise components. The oversampled WOLA allows a wide range of gain and phase adjustments in the frequency domain. For example, the noise reduction techniques, such as spectral subtraction, beam-forming, and subband adaptive filters, using the oversampled WOLA process are described in "Highly Oversampled Subband Adaptive Filters For Noise Cancellation On A Low-Resource DSP System" by King Tam, Hamid Sheikhzadeh, Todd Schneider, Proceeding of ICSLP 2002, pp 1793–1796 and in "A Subband Beamformer On An Ultra Low-Power Miniature DSP Platform" by Edward Chau, Hamid Sheikhzadeh, Robert Brennan, Todd Schneider, Proceeding of ICAPP 2002, page III-2953 to III-2956, which are incorporated herewith by reference. The noise reduction technique, such as spectral subtraction, beam-forming and subband adaptive filters may be integrated with the feature extraction on the DSP system 100B, which is specifically designed for the oversampled WOLA process According to the speech processing system 1000 of FIG. 1, the speech recognition system 100 of FIG. 1 is implemented on the platform (100A, 100B) having three processor units, which is designed for speech processing. The speech recognition algorithm is efficiently mapped to the three processing units to achieve low resource utilisation.

The speech recognition algorithm and system are deployed on the hardware platform (100B) specifically designed for speech processing. Different sections of the algorithm are allocated to specific components of the hardware platform and are mapped in a manner that produces a speech recognition system that uses much less power and is much smaller than current systems.

The type of hardware used and the way the speech recognition algorithms are mapped to the hardware components makes the system as a whole customizaole in an efficient way, particularly in terms of integrating noise reduction. Noise reduction algorithms can be added easily and be adapted to the situation. This results in robustness and ultimately produces better recognition accuracy in noisy environments while maintaining low resource usage.

The use of the specific hardware platform (100B) and the way that the methods are implemented on this platform provides the following advantages: 1) Capabilities and accuracy associated with the state-of-the-art methods. Namely, it is scalable as far as vocabulary size is concerned, provides very good accuracy, and can be deployed in a number of applications such as voice command, speaker identification, and continuous speech recognition; 2) Uses very little power and occupies very little space; and 3) Suitable for the integration of state-of-the-art noise reduction algorithms.

The speech recognition system (100) is particularly useful in environments where power consumption must be reduced to a minimum or where an embedded processor does not have the capabilities to do speech recognition. For example, it can be used in a personal digital assistant (PDA) to off-load the main processor in an efficient manner. The system, which may be implemented in one or more highly integrated chips, can also be used in conjunction with a micro-controller in embedded systems or in a standalone environment.

The speech recognition algorithm is applicable to a wide range of languages. Scalability in terms of vocabulary and applications is achieved.

The speech recognition algorithm can be applied to a variety of applications using audio input, such as a voice command system in which an incoming voice signal (i.e. command) is analyzed and results in some operation, speaker identification, speech recognition, or continuous speech recognition.

In the above description, various parameters used in the system, such as sample rate, sample accuracy, window size, frame size, are used as examples. Other parameters and accuracies may be substituted or chosen, depending on the system requirements, and other factors.

While the present invention has been described with reference to specific embodiments, the description is illustrative of the invention and is not to be construed as limiting the invention. Various modifications may occur to those skilled in the art without departing from scope of the invention as defined by the claims.

What is claimed is:

1. A system for recognizing speech in real-time, the system comprising:
   an input processor for receiving samples of speech and organizing the samples into a frame; and
   at least two programmable processor units having functionality of feature extraction of the frame based on Oversampled Filterbank Analysis (OFBA) and pattern matching, thereby recognizing a speech pattern, the functionality being divided and assigned to each processor unit, the feature extraction including a bin energy factorization and an additional signal processing for the feature extraction,
   the at least two processor units including:
      a first processor unit for performing the OFBA and the bin energy factorization, and
      one or more second processor units for performing the additional signal processing and the pattern matching,
   the processor units operating sequentially or substantially in parallel, the processor unit and the input processor operating sequentially or substantially in parallel.

2. The system as claimed claim 1 wherein the input processor and the processor units operate in parallel.

3. The system as claimed in claim 2 further comprising a memory, the input processor and the processor units sharing the memory.

4. The system as claimed in claim 2, wherein the one or more second processor units perform the additional signal processing of determining FFT band energies, energy bins and Mel Frequency Cepstrum Coefficient (MFCC).

5. The system as claimed in claim 4, wherein the first processor unit performs the bin energy factorization using vector multiplication which multiplies the FFT band energies by a vector, and the second processor unit launches the vector multiplication when the FFT band energies are calculated.

6. The system as claimed in claim 5, wherein the first processor unit stores the results of the vector multiplication in a first buffer, the one or more second processor units subtracting the data in the first buffer from an original FFT band energies, and storing the subtraction results in a second buffer.

7. The system as claimed in claim 6, wherein the one or more second processor units assign the values in the first and second buffers using an index table mapping the FFT bands to the energy bins.

8. The system as claimed in claim 6, wherein the one or more second processor units calculate the Discrete Cosine Transform (DCT) based on the results of the mapping.

9. The system as claimed in claim 6, wherein the first processor unit calculates the Discrete Cosine Transform (DCT).

10. The system as claimed in claim 4, wherein at least one of the second processor units performs the pattern matching such that the second processor unit compares the input against pre-stored templates using a pattern matching technique.

11. The system as claimed in claim 4, wherein at least one of the second processor units performs the pattern matching using Hidden Markov Models (HMM).

12. The system as claimed in claim 4, wherein at least one of the second processor unit performs the pattern matching using Dynamic Time Warping (DTW).

13. The system as claimed in claim 12, wherein the pattern matching technique includes one or more general pattern recognition techniques including artificial neural networks, Baysian classification, and template matching using Euclidian or other distances.

14. The system as claimed in claim 4, wherein the one or more second processor units perform endpoint detection when calculating the FFT band energies.

15. The system as claimed in claim 1, wherein the input processor applies a pre-emphasis filter to each sample.

16. The system as claimed in claim 1, wherein the at least two programmable processor units include a module for performing endpoint detection of the speech based on the feature extracted from the result of the OFBA.

17. A method of recognizing speech in real-time, the method comprising the steps of:
  receiving samples of speech and creating a frame;
  extracting a feature of the frame by performing Oversampled Filterbank Analysis (OFBA) thereby recognizing a speech pattern; and
  performing pattern matching based on the feature,
  the creating step, the extracting step and the performing step being implemented substantially in parallel,
  the extracting step including steps of:
    performing the OFBA and a bin energy factorization, and
    performing an additional signal processing for the feature extraction,
  the step of performing the OFBA and a bin energy factorization and the step of performing an additional signal processing being implemented substantially in parallel.

18. A method as claimed in claim 17, wherein the extracting step includes the steps of:
  performing Fast Fourier Transform (FFT); and
  calculating an Discrete Cosine Transform (DCT) based on FFT band energies and generating a Mel Frequency Cepstrum Coefficient (MFCC) based on the DCT, and
  the step of performing a bin energy factorization utilizing vector multiplication which multiples the FFT band energies by a vector,
  the step of performing FFT, the step of performing a bin energy factorization, and the step of calculating DCT and generating a MFCC being implemented substantially in parallel to the creating step for a next frame.

19. A method as claimed in claim 18, wherein the factorization step includes a step of storing the results of the vector multiplication in a first buffer and a step of subtracting the data on the first buffer from the original FFT band energies, and a step of storing the subtraction results in a second buffer.

20. A method as claimed in claim 19 wherein the factorization step includes a step of assigning the values in the first and second buffers to the energy bins using an index table mapping the FFT bands to the energy bins.

21. A method of recognizing speech in real-time, the method comprising the steps of:
  receiving samples of speech and creating a frame;
  extracting a feature of the frame by performing Oversampled Filterbank Analysis (OFBA), the extracting step comprising the step of detecting an endpoint of the speech based on the feature extracted from the result of the OFBA; and
  performing pattern matching based on the feature,
  the creating step, the extracting step and the performing step being implemented substantially in parallel.

22. A method of speech processing in real-time, comprising the steps of:
  receiving samples of speech and creating a frame;
  extracting a feature of the frame by performing Oversampled Filterbank Analysis (OFBA), thereby recognizing a speech pattern the extracting step comprising the step of detecting an endpoint of the speech based on the feature extracted from the result of the OFBA,
  the creating step, the extracting step, and the performing step being implemented substantially in parallel.

23. A system for speech processing in real-time, the system comprising:
  an input processor for receiving samples of speech and creating a frame; and
  at least two processor units having functionality of feature extraction of the frame based on Oversampled Filterbank Analysis (OFBA), thereby recognizing a speech pattern the at least two programmable processor units including a module for performing endpoint detection of the speech based on the feature extracted from the result of the OFBA,
  the at least tow processor units operating sequentially or substantially in parallel.

* * * * *